(12) United States Patent
Izuki

(10) Patent No.: US 6,875,714 B2
(45) Date of Patent: Apr. 5, 2005

(54) OPTICAL GLASS AND OPTICAL ELEMENT MADE OF THE OPTICAL GLASS

(75) Inventor: Manabu Izuki, Kobe (JP)

(73) Assignee: Minolta Co., Ltd., Osaka (JP)

( * ) Notice: Subject to any disclaimer, the term of this patent is extended or adjusted under 35 U.S.C. 154(b) by 159 days.

(21) Appl. No.: 10/423,997

(22) Filed: Apr. 25, 2003

(65) Prior Publication Data
US 2003/0220182 A1 Nov. 27, 2003

(30) Foreign Application Priority Data
Apr. 25, 2002 (JP) .................................. 2002-124117

(51) Int. Cl.[7] .............................. C03C 3/14; C03C 3/17; C03C 3/19; C03C 3/21
(52) U.S. Cl. ........................ 501/45; 501/46; 501/47; 501/48; 501/51; 501/901; 501/903
(58) Field of Search ................ 501/45, 46, 47, 501/48, 51

(56) References Cited

U.S. PATENT DOCUMENTS

| | | | | |
|---|---|---|---|---|
| 4,996,173 A | * | 2/1991 | Tachiwana .................. | 501/73 |
| 6,333,282 B1 | * | 12/2001 | Nakahata et al. ............ | 501/45 |
| 2002/0042337 A1 | * | 4/2002 | Zou et al. .................... | 501/45 |

FOREIGN PATENT DOCUMENTS

| | | |
|---|---|---|
| JP | 8-157231 A | 6/1996 |
| JP | 2001-58845 A | 3/2001 |

* cited by examiner

*Primary Examiner*—David Sample
(74) *Attorney, Agent, or Firm*—Sidley Austin Brown & Wood LLP

(57) ABSTRACT

An optical glass consists essentially, expressed in term of weight percent, of: $P_2O_5$: 20.0 to 30.0%, $B_2O_3$: 0.5 to 10.0%, $Nb_2O_5$: 5.0 to 50.0%, $WO_3$: 15.0 to 27.0%, $Bi_2O_3$: 0.1 to 3.0%, ZnO: 1.0 to 7.0%, $Li_2O$: 0 to 8.0%, $Na_2O$: 0 to 15.0%, $K_2O$: 0 to 15.0%, and $Li_2O+Na_2O+K_2O$: 5.0 to 20.0%.

15 Claims, 1 Drawing Sheet

OPTICAL GLASS AND OPTICAL ELEMENT MADE OF THE OPTICAL GLASS

RELATED APPLICATION

This application is based on application No. 2002-124117 filed on Apr. 25, 2002 in Japan, the content of which is hereby incorporated by reference.

FIELD OF THE INVENTION

The present invention relates to an optical glass, and more specifically, to an optical glass suitable for press molding, having a low glass transition temperature (Tg) and deformation temperature (At) while having an optical constant of a high refractive index and high dispersion (nd: 1.78 to 1.86, vd: 22 to 27) and excellent resistance to coloration. Moreover, the present invention relates to an optical element made of the optical glass.

DESCRIPTION OF THE PRIOR ART

An example of a technology with which a glass having a difficult-to-process configuration such as a free-form surface configuration can be comparatively easily manufactured is a precision press molding method. According to this molding method, conventionally required lens polishing and cutting are unnecessary, so that cost is reduced. When glass is molded by the precision press molding method, since it is necessary to set the pressing die at a temperature close to or higher than the glass transition temperature (hereinafter, sometimes referred to as "Tg"), the higher Tg and At of the glass is, the more the surface of the pressing die is oxidized and the metal composition thereof is changed, so that the deterioration of the die is considerable to decrease the life of the die. As a measure to suppress the metal deterioration, it is considered to control the molding atmosphere so as to be an inert atmosphere such as a nitrogen atmosphere. However, this increases the manufacturing cost. Therefore, a glass having as low Tg and At as possible is desirable as the glass used for the precision press molding method.

In response to growing awareness of environmental issues in recent years, it is strongly desired that Pb compounds and As compounds whose adverse effects on the human body are a matter of concern be not used for optical glasses for precision press molding. Therefore, attempts have been made to maintain the conventional optical performance by using a large quantity of alkaline components, $TiO_2$, $Bi_2O_3$ and the like instead of using Pb compounds in a conventional heavy flint type (high refractive index and high dispersion) optical glass ($P_2O_5$—$Nb_2O_5$) containing a large quantity of PbO. For example, Japanese Laid-Open Patent Application No. H08-157231 proposes that the optical glass contains a large quantity of $TiO_2$ in addition to $Nb_2O_5$ so as to achieve a high refractive index and high dispersion and contains alkali-metal oxides such as $Li_2O$ and $Na_2O$ so that Tg and At are low. Japanese Laid-Open Patent Application No. 2001-58845 proposes that the optical glass contains a large quantity of $Bi_2O_3$ and alkali-metal oxides such as $Li_2O$ and $Na_2O$ so that Tg and At are low.

Certainly, $TiO_2$ is a component very effective at achieving a high refractive index and high dispersion, and $Bi_2O_3$ is also a component very effective at achieving a high refractive index and high dispersion while maintaining Tg and At low. However, when these glass components are contained in a large quantity, a significant problem arises that the light transmittance (the degree of coloration) in the visible region deteriorates. Optical glasses having poor light transmittance are undesirable as taking system lenses. In addition, when a large quantity of $TiO_2$ is contained, Tg and At are high, so that it is necessary to perform press molding at a high temperature. This makes the molding die readily oxidize and deteriorate.

SUMMARY OF THE INVENTION

An object of the present invention is to provide an improved optical glass.

Another object of the present invention is to provide an optical glass having an optical constant of a high refractive index and high dispersion without the use of any Pb compounds or As compounds whose adverse effects on the human body are a matter of concern.

Still another object of the present invention is to provide an optical glass excellent in the resistance to coloration, having a low Tg and At, and suitable for precision press molding.

As a result of diligently making examinations to attain the above-mentioned objects, the inventor of the present invention has arrived at the present invention by finding the following: By using $WO_3$ instead of $TiO_2$ and $Bi_2O_3$ and using alkali-metal oxides and ZnO as well in a $P_2O_5$—$Nb_2O_5$ glass, a high refractive index and high dispersion, and a low Tg and At are obtained without the use of any Pb compounds or As compounds and an excellent resistance to coloration is obtained, and by a small quantity of $B_2O_3$ and $Bi_2O_3$ being contained, the resistance to devitrification is improved.

Specifically, an optical glass of the present invention substantially contains the following components: In percent by weight, $P_2O_5$: 20.0 to 30.0%, $B_2O_3$: 0.5 to 10.0%, $Nb_2O_5$: 25.0 to 50.0%, $WO_3$: 15.0 to 27.0%, $Bi_2O_3$: 0.1 to 3.0%, ZnO: 1.0 to 7.0%, $Li_2O$: 0 to 8.0%, $Na_2O$: 0 to 15.0%, $K_2O$: 0 to 15.0%, $Li_2O+Na_2O+K_2O$: 5.0 to 20.0%. In this specification, "%" used below denotes "wt %" unless otherwise noted.

Moreover, one or at least two of the following glass components may be further contained in the above-described optical glass composition: CaO: 0 to 5.0%; SrO: 0 to 10.0%; BaO: 0 to 10.0%; $TiO_2$: 0 to 2.0%; and $Sb_2O_3$: 0 to 0.5%.

BRIEF DESCRIPTION OF THE DRAWINGS

This and other objects and features of this invention will become clear from the following description, taken in conjunction with the preferred embodiments with reference to the accompanied drawings I which.

DESCRIPTION OF THE PREFERRED EMBODIMENT

Figure 1:
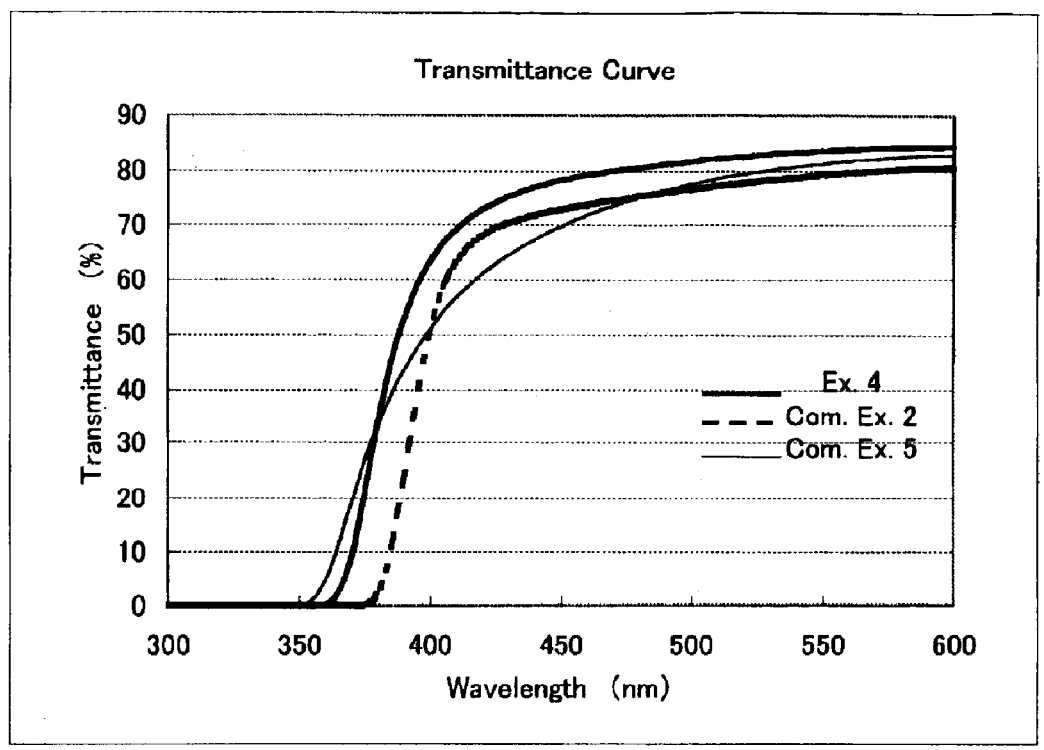
FIG. 1 is a graph showing the transmittance curves of optical glasses of a fourth example, a second comparative example and a fifth comparative example.

Hereinafter, the present invention will be described. An optical glass of the present invention contains the following components in percent by weight, $P_2O_5$: 20.0 to 30.0%, $B_2O_3$: 0.5 to 10.0%, $Nb_2O_5$: 25.0 to 50.0%, $WO_3$: 15.0 to 27.0%, $Bi_2O_3$: 0.1 to 3.0%, ZnO: 1.0 to 7.0%, $Li_2O$: 0 to 8.0%, $Na_2O$: 0 to 15.0% and $K_2O$: 0 to 15.0%.

Moreover, one or at least two of the following glass components may be further contained in the above-described optical glass composition: CaO: 0 to 5.0%; SrO: 0 to 10.0%; BaO: 0 to 10.0%; $TiO_2$: 0 to 2.0%; and $Sb_2O_3$: 0 to 0.5%.

It will be described why the ranges of the contents of the optical components are limited to the above-mentioned ones.

$P_2O_5$ is the main component forming the mesh structure of the glass. When its content is lower than 20%, the resistance to devitrification is low, so that the glass is unstable. When its content is higher than 30%, the refractive index is low, so that a desired optical constant cannot be obtained and Tg and At are high. For this reason, the range of its contents is set to 20.0 to 30.0%. A more desirable range of its content is 21.0 and 26.0%.

$B_2O_3$ is an essential component of the present invention, and has the effect of significantly improving the resistance of the glass to devitrification. However, when its content is lower than 0.5%, the effect is not sufficiently obtained, and when its content is higher than 10.0%, the refractive index and the chemical durability of the glass are low. For this reason, the range of its content is set to 0.5 to 10.0%. A more desirable range of its content is 1.0 to 7.0%.

$Nb_2O_5$ is a component essential for obtaining an optical constant of a high refractive index and high dispersion. When its content is lower than 25.0%, a glass of a target high refractive index and high dispersion is not obtained. When its content is higher than 50.0%, the resistance to devitrification is low and Tg and At are high. For this reason, the range of its content is set to 25.0 to 50.0%. A more desirable range of its content is 30.0 to 45.0%.

$WO_3$ is a component necessary for obtaining an optical constant of a high refractive index and high dispersion. By using this together with $Nb_2O_5$, a high refractive index and high dispersion can be achieved while Tg and At are maintained low. When the content of $WO_3$ is lower than 15.0%, the above-mentioned effect is not delivered. When the content is higher than 27.0%, the glass is colored and the chemical durability is deteriorated. For this reason, the range of its content is set to 15.0 to 27.0%. A more desirable range of its content is 15.0 to 24.0%.

ZnO has the effect of increasing the refractive index and decreasing Tg. When its content is lower than 1.0%, this effect is not delivered. When its content is higher than 7.0%, the resistance of the glass to devitrification is low. For this reason, the range of its content is set to 1.0 to 7.0%. A more desirable range of its content is 1.0 to 5.0%.

$Bi_2O_3$ has the effect of improving the resistance of the glass to devitrification and decreasing Tg and At. When its content is lower than 0.1%, this effect is not delivered. When its content is higher than 3.0%, the resistance of the glass to coloration is low. For this reason, the range of its content is set to 0.1 to 3.0%. A more desirable range of its content is 0.1 to 2.0%.

The alkali-metal oxides $Li_2O$, $Na_2O$ and $K_2O$ are components necessary for decreasing Tg and At. When the content of $Li_2O$ is higher than 8.0%, the chemical durability and the refractive index are low, so that a desired optical constant is not obtained. When the content of $Na_2O$ is higher than 15.0% or the content of $K_2O$ is higher than 15.0%, a target optical constant is not obtained and the resistance to devitrification and the chemical durability are low. For this reason, the ranges of the contents of $Li_2O$, $Na_2O$ and $K_2O$ are set to not more than 8.0%, not more than 15.0% and not more than 15.0%, respectively. More desirable ranges of the contents of $Li_2O$ and $Na_2O$ are 2.0 to 5.0% and 8.0 to 10.0%, respectively.

In addition, it is important that the total content of the alkali-metal oxides is in a range of 5.0 to 20.0%. This is because when the total content is lower than 5.0%, Tg and At are high and when the total content is higher than 20.0%, the refractive index is low, so that not only a desired optical constant is not obtained but also the resistance to devitrification is low. A more desirable range of the total content is 7.0 to 13.0%.

Moreover, the optical glass of the present invention may further contain a predetermined quantity of one or at least two of the glass components CaO, SrO, BaO, $TiO_2$ and $Sb_2O_3$ as required. Why the components that may be further contained are limited to these components will be described below.

CaO, SrO and BaO have the effect of suppressing distortion caused in precision press molding, and are capable of adjusting the refractive index and dispersion without deteriorating the resistance to devitrification. However, when their contents are higher than the predetermined quantity, there is a possibility that Tg and At are high. For this reason, it is desirable that the contents of CaO, SrO and BaO be not more than 5.0%, not more than 10.0% and not more than 10.0%, respectively.

$TiO_2$ improves the stability of the glass by being added in a small quantity. However, when its content is higher than 2.0%, there is a possibility that the resistance to coloration is low. In addition, there is a possibility that Tg and At are high. For this reason, it is desirable that the range of its content be not more than 2.0%.

$Sb_2O_3$ can be added in a small quantity because it has an effect as a clarificant. For this reason, it is desirable that the range of its content be not more than 0.5%.

Other known glass components and additives may be added as required within the bounds of not hindering the effects of the present invention. In view of the protection of the environment, however, it is desirable that neither Pb nor As be contained substantially.

The method of manufacturing the optical glass of the present invention is not specifically limited, and a known manufacturing method may be used. For example, as the materials of each component, the corresponding phosphate, carbonate, nitrate, oxide and the like are used, are weighed in a desired ratio, and are sufficiently mixed in powder form into a prepared material. This is charged, for example, into a platinum crucible in an electric furnace heated to 1,000 to 1,200° C., is molten and clarified, is agitated so as to be homogeneous, is cast in a preheated mold, and is annealed. Or a method using a continuous melting apparatus to perform continuous manufacture may be used.

Then, this is processed into a desired configuration by precision press molding. The press molding method that can be used here is not specifically limited, and a known press molding method is used. For example, a reheating molding method as described above is used of mounting a preform material in a mold and heating it to a temperature not less than the glass softening point to perform press molding. According to this method, polishing and cutting are unnecessary, so that productivity improves.

As for molding conditions, although they differ according to the glass components and the configuration of the lens to be molded, generally, the mold temperature is desirably in a range of 400 to 540° C. Of this range, a high temperature region close to the glass transition temperature is desirable. The press time is desirably in a range of several seconds to several minutes. The longer the press time is, the higher the precision of the mold is. The press pressure is desirably in a range of several kgf/cm$^2$ to several hundreds of kgf/cm$^2$. The higher the press pressure is, the higher the precision of the mold is. The glass viscosity at the time of molding is desirably in a range of $10^1$ to $10^{12}$ poises.

The optical glass of the present invention is used as various kinds of lenses such as bi-convex lenses, bi-concave lenses, plano-convex lenses, plano-concave lenses and meniscus lenses, and prisms.

Hereinafter, the present invention will be further concretely described with reference to numerical examples and comparative examples. It is to be noted that the present invention is not limited to these examples.

FIRST TO SEVENTH EXAMPLES AND FIRST TO EIGHTH COMPARATIVE EXAMPLES

Using typical glass materials such as oxide materials, carbonate and nitrate, glass materials were prepared so that the composition was the target composition shown in Table 1, and were sufficiently mixed in powder form into a prepared material. This was charged into a platinum crucible in an electric furnace, was molten and clarified, was agitated so as to be homogeneous, was cast in a preheated mold, and was annealed, thereby forming the samples. The first to the third comparative examples are re-created ones of the fist, the fifth and the fourteenth examples described in Japanese Laid-Open Patent Application No. 2001-58845. The fourth and the fifth comparative examples are re-created ones of the tenth and the eleventh examples described in Japanese Laid-Open Patent Application No. 8-157231.

EVALUATION OF THE SAMPLES

The devitrifiability of each of the formed samples at the time of casting was visually evaluated. Then, the refractive index (nd) and the Abbe number (vd) to the d-line, the glass transition temperature (Tg) and the deformation temperature (At) of each of the formed samples were measured. Then, the degree of coloration (wavelengths where the transmittance is 70% and where it is 5%) was measured by use of "U-4100" manufactured by Hitachi, Ltd. These measurements were performed according to a test method of Japanese Optical Glass Industrial Standards (JOGIS). The results of the measurements are shown in Tables 1 and 2. The transmittance curves of the optical glasses of the fourth example, the second comparative example and the fifth example are shown in FIG. 1.

TABLE 1

|  | Ex. 1 | Ex. 2 | Ex. 3 | Ex. 4 | Ex. 5 | Ex. 6 | Ex. 7 |
|---|---|---|---|---|---|---|---|
| $P_2O_5$ | 23.0 | 24.0 | 25.0 | 22.0 | 22.0 | 23.0 | 22.5 |
| $B_2O_3$ | 2.5 | 1.0 | 2.0 | 1.0 | 0.5 | 7.0 | 1.0 |
| $Li_2O$ | 3.8 | 4.0 | 5.0 | 3.5 | 4.0 | 4.0 | 2.5 |
| $Na_2O$ | 5.5 | 4.0 | 5.0 | 4.5 | 2.0 | 4.0 | 10.2 |
| $K_2O$ |  | 1.0 |  | 4.0 | 11.5 |  |  |
| CaO |  |  |  |  |  |  |  |
| SrO | 2.0 | 5.0 |  |  |  |  |  |
| BaO | 7.0 | 2.0 |  | 5.0 |  |  |  |
| ZnO | 2.0 | 2.0 | 3.0 | 5.0 | 2.0 | 1.0 | 2.0 |
| $Nb_2O_5$ | 37.2 | 35.5 | 44.0 | 28.5 | 37.0 | 40.0 | 38.0 |
| $WO_3$ | 16.0 | 21.0 | 15.0 | 26.0 | 19.5 | 19.0 | 22.8 |
| $Bi_2O_3$ | 1.0 | 0.5 | 1.0 | 0.5 | 1.5 | 2.0 | 1.0 |
| Refractive Index (nd) | 1.8200 | 1.8355 | 1.8448 | 1.8023 | 1.8123 | 1.8334 | 1.8317 |
| Abbe Number (vd) | 25.2 | 23.8 | 23.2 | 25.9 | 24.4 | 23.2 | 23.5 |
| (λ 70%) | 413 | 412 | 416 | 412 | 413 | 416 | 413 |
| (λ 5%) | 372 | 370 | 375 | 368 | 367 | 378 | 372 |
| Tg(° C.) | 487 | 480 | 494 | 483 | 492 | 499 | 498 |
| At(° C.) | 534 | 528 | 540 | 529 | 535 | 547 | 543 |

TABLE 2

|  | Com. Ex 1 | Com. Ex 2 | Com. Ex 3 | Com. Ex 4 | Com. Ex 5 | Com. Ex 6 | Com. Ex 7 | Com. Ex 8 |
|---|---|---|---|---|---|---|---|---|
| $P_2O_5$ | 28.7 | 29.0 | 23.0 | 23.8 | 27.8 | 22.7 | 18.0 | 21.3 |
| $Li_2O$ | 3.8 | 3.6 | 3.0 | 3.0 | 2.0 | 3.5 | 3.0 | 4.0 |
| $Na_2O$ | 5.0 | 5.2 | 8.0 | 5.7 | 6.7 | 6.5 | 10.0 | 2.0 |
| $K_2O$ |  |  |  | 1.5 | 2.5 |  |  | 16.0 |
| CaO |  |  |  |  |  |  |  |  |
| SrO |  |  |  |  |  |  |  |  |
| BaO |  |  |  | 6.0 | 12.3 | 5.0 |  |  |
| $B_2O_3$ |  |  |  |  | 2.6 | 2.6 |  |  |
| ZnO |  |  |  |  |  | 8.0 | 3.5 | 0.5 |
| $Nb_2O_5$ | 27.7 | 34.4 | 38.0 | 38.3 | 39.8 | 37.3 | 38.0 | 35.5 |
| $WO_3$ |  |  | 12.0 | 9.0 | 5.0 | 20.5 | 23.0 | 19.5 |
| $Bi_2O_3$ | 34.8 | 26.6 | 12.0 |  |  | 1.0 | 1.5 | 0.5 |
| $TiO_2$ |  |  |  | 3.6 | 8.6 |  |  |  |
| $GeO_2$ |  | 1.2 |  |  |  |  |  |  |
| $B_2O_3$ |  |  |  |  |  | 0.5 | 3.0 | 0.7 |
| $As_2O_3$ |  |  |  | 0.2 |  |  |  |  |
| Refractive Index (nd) | 1.8394 | 1.838 | 1.8491 | 1.8282 | 1.8442 | — | — | — |

TABLE 2-continued

|  | Com. Ex 1 | Com. Ex 2 | Com. Ex 3 | Com. Ex 4 | Com. Ex 5 | Com. Ex 6 | Com. Ex 7 | Com. Ex 8 |
|---|---|---|---|---|---|---|---|---|
| Abbe Number (vd) | 24.7 | 24.4 | 23.6 | 24.3 | 21.4 | — | — | — |
| (λ 70%) | 464 | 433 | 422 | 419 | 429 | — | — | — |
| (λ 5%) | 368 | 369 | 373 | 374 | 383 | — | — | — |
| Tg(° C.) | 442 | 466 | 478 | 518 | 552 | — | — | — |
| At(° C.) | 486 | 511 | 525 | 562 | 602 | — | — | — |

As is apparent from Table 1, the optical glasses of the first to the seventh examples each have a high refractive indices (1.8023 to 1.8448) and high dispersion (Abbe numbers: 23.2 to 25.9), and have a glass transition temperature (Tg) of not more than 499° C. and a deformation temperature (At) of not more than 547° C., which are desirable temperatures for press molding. Further, as typified by the optical glass of the fourth example of FIG. 1, in the optical glasses of the first to the seventh examples, the wavelengths A 70% where the transmittance is 70% are not more than 416 nm, which indicates that the first to the seventh examples are excellent in the resistance to coloration compared to the comparative examples.

On the contrary, in the optical glasses of the first to the third comparative examples containing a large quantity of $Bi_2O_3$, although Tg and At are low, the wavelength λ70% is not less than 422 nm, which indicates that the degree of coloration is high. This tendency becomes more remarkable as the content of $Bi_2O_3$ increases. In the optical glasses of the fourth and the fifth comparative examples containing a large quantity of $TiO_2$, the glass transition temperature and the deformation temperature are as high as not less than 518° C. and not less than 562° C., respectively. Thus, the fourth and the fifth comparative examples are unsuitable for press molding. The optical glass of the sixth comparative example containing as much as 8.0% of ZnO, the optical glass of the seventh comparative example containing as little as 18.0% of $P_2O_5$, and the optical glass of the eighth comparative example containing as little as 0.5% of ZnO and as much as 16.0% of $K_2O$ are all devitrified when molten.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An optical glass consisting essentially, expressed in term of weight percent, of:
   $P_2O_5$: 20.0 to 30.0%,
   $B_2O_3$: 0.5 to 10.0%,
   $Nb_2O_5$: 25.0 to 50.0%,
   $WO_3$: 15.0 to 27.0%,
   $Bi_2O_3$: 0.1 to 3.0%,
   ZnO: 1.0 to 7.0%,
   $Li_2O$: 0 to 8.0%,
   $Na_2O$: 0 to 15.0%,
   $K_2O$: 0 to 15.0%, and
   $Li_2O+Na_2O+K_2O$: 5.0 to 20.0%.

2. An optical glass as claimed in claim 1, wherein the glass comprises one or more components selected from a group including:
   CaO: 0 to 5.0%;
   SrO: 0 to 10.0%;
   BaO: 0 to 10.0%;
   $TiO_2$: 0 to 2.0%; and
   $Sb_2O_3$: 0 to 0.5%.

3. An optical glass as claimed in claim 1, wherein the glass substantially comprises neither Pb nor As.

4. An optical glass as claimed in claim 1, wherein the glass has a refractive index between 1.78 and 1.86.

5. An optical glass as claimed in claim 1, wherein the glass has an Abbe number between 22 and 27.

6. An optical glass as claimed in claim 1, wherein the glass has a glass transition temperature (Tg) of not more than 499° C.

7. An optical glass as claimed in claim 1, wherein the glass has a deformation temperature (At) of not more than 547° C.

8. An optical element made of an optical glass, the glass consisting essentially, expressed in term of weight percent, of:
   $P_2O_5$: 20.0 to 30.0%,
   $B_2O_3$: 0.5 to 10.0%,
   $Nb_2O_5$: 25.0 to 50.0%,
   $WO_3$: 15.0 to 27.0%,
   $Bi_2O_3$: 0.1 to 3.0%,
   ZnO: 1.0 to 7.0%,
   $Li_2O$: 0 to 8.0%,
   $Na_2O$: 0 to 15.0%,
   $K_2O$: 0 to 15.0%, and
   $Li_2O+Na_2O+K_2O$: 5.0 to 20.0%.

9. An optical element as claimed in claim 8, wherein the glass comprises one or two or more components selected from a group including:
   CaO: 0 to 5.0%;
   SrO: 0 to 10.0%;
   BaO: 0 to 10.0%;
   $TiO_2$: 0 to 2.0%; and
   $Sb_2O_3$: 0 to 0.5%.

10. An optical element as claimed in claim 8, wherein the glass substantially comprises neither Pb nor As.

11. An optical element as claimed in claim 8, wherein the glass has a refractive index between 1.78 and 1.86.

12. An optical element as claimed in claim 8, wherein the glass has an Abbe number between 22 and 27.

13. An optical element as claimed in claim 8, wherein the glass has a glass transition temperature (Tg) of not more than 499° C.

14. An optical element as claimed in claim 8, wherein the glass has a deformation temperature (At) of not more than 547° C.

15. A method of manufacturing an optical element, comprising steps of:

provide an optical glass consisting essentially, expressed in term of weight percent, of:

$P_2O_5$: 20.0 to 30.0%,
$B_2O_3$: 0.5 to 10.0%,
$Nb_2O_5$: 25.0 to 50.0%,
$WO_3$: 15.0 to 27.0%,
$Bi_2O_3$: 0.1 to 3.0%,
ZnO: 1.0 to 7.0%,
$Li_2O$: 0 to 8.0%,
$Na_2O$: 0 to 15.0%,
$K_2O$: 0 to 15.0%, and
$Li_2O+Na_2O+K_2O$: 5.0 to 20.0%;

heating the glass in a mold having a configuration corresponding to the optical element to be molded; and molding the glass under the predetermined molding conditions.

* * * * *